United States Patent
Thompson et al.

(10) Patent No.: US 10,657,371 B1
(45) Date of Patent: May 19, 2020

(54) MINIATURIZED ASTROMETRIC ALIGNMENT SENSOR FOR DISTRIBUTED AND NON-DISTRIBUTED GUIDANCE, NAVIGATION, AND CONTROL SYSTEMS

(71) Applicant: United States of America, as represented by the Administrator of NASA, Washington, DC (US)

(72) Inventors: Sabrina N. Thompson, Greenbelt, MD (US); Sean R. Semper, Greenbelt, MD (US); Philip C. Calhoun, Greenbelt, MD (US); Neerav Shah, Greenbelt, MD (US)

(73) Assignee: United States of America as represented by the Administrator of NASA, Washington, DC (US)

( * ) Notice: Subject to any disclaimer, the term of this patent is extended or adjusted under 35 U.S.C. 154(b) by 125 days.

(21) Appl. No.: 16/145,570

(22) Filed: Sep. 28, 2018

(51) Int. Cl.
| | |
|---|---|
| *G06K 9/00* | (2006.01) |
| *G06T 7/73* | (2017.01) |
| *G06T 7/246* | (2017.01) |
| *G06K 9/46* | (2006.01) |
| *G01C 21/02* | (2006.01) |
| *G06K 9/40* | (2006.01) |

(52) U.S. Cl.
CPC ......... *G06K 9/0063* (2013.01); *G01C 21/025* (2013.01); *G06K 9/40* (2013.01); *G06K 9/4647* (2013.01); *G06T 7/246* (2017.01); *G06T 7/73* (2017.01); *G06T 2207/10032* (2013.01); *G06T 2207/30252* (2013.01)

(58) Field of Classification Search
CPC ...... G01C 21/02; G01C 21/10; G01C 21/025; G01C 21/165; G06T 7/207; G06T 7/215; G06T 5/50; G06T 7/277; G06T 5/003; G06K 9/00; B64G 1/36; B64G 3/00; B64G 1/361; B64G 1/244; H04N 5/2259; H04N 5/225; H04N 7/18; G01S 3/7867
USPC ........ 382/103, 106, 113, 154, 190; 701/523; 702/142; 244/3.16
See application file for complete search history.

(56) References Cited

U.S. PATENT DOCUMENTS

| | | | | |
|---|---|---|---|---|
| 5,745,869 A | * | 4/1998 | van Bezooijen | ....... B64G 1/361 701/513 |
| 5,935,195 A | * | 8/1999 | Quine | .................... B64G 1/361 356/139.01 |
| 8,170,278 B2 | * | 5/2012 | Zhao | .................. G06K 9/00785 382/103 |

(Continued)

FOREIGN PATENT DOCUMENTS

| | | | |
|---|---|---|---|
| CN | 103954280 A | * 7/2014 | |
| WO | WO-9711882 A2 | * 4/1997 | ............. B64G 1/244 |

*Primary Examiner* — Mahendra R Patel
(74) *Attorney, Agent, or Firm* — Matthew F. Johnston; Bryan A. Geurts

(57) ABSTRACT

A miniaturized astrometric alignment sensor may detect stellar objects and targets from which both stellar and object tracking are performed. The sensor may search for one or more bright opens in an image captured by a camera of a space vehicle, and determine if the one or more bright objects is a genuine star or a secondary element. The sensor may also catalog entries of identified stars after three or more bright objects are determined to be genuine stars, and display the cataloged entries of the identified stars, wherein the cataloged entries comprises positional and velocity of the space vehicle in relation of the identified stars and a sensor body reference frame.

5 Claims, 7 Drawing Sheets

(56) References Cited

U.S. PATENT DOCUMENTS

| | | | | |
|---|---|---|---|---|
| 8,260,567 B1* | 9/2012 | Kaplan | G01S 5/16 | 250/393 |
| 8,294,073 B1* | 10/2012 | Vance | H04N 5/2259 | 250/203.1 |
| 8,837,782 B1* | 9/2014 | Rosenwinkel | G01C 21/02 | 382/106 |
| 9,073,648 B2* | 7/2015 | Tsao | B64G 1/36 | |
| 9,217,643 B1* | 12/2015 | Belenkii | G01S 5/16 | |
| 9,702,702 B1* | 7/2017 | Lane | G01C 21/025 | |
| 2003/0009284 A1* | 1/2003 | Needelman | B64G 1/361 | 701/513 |
| 2008/0063237 A1* | 3/2008 | Rubenstein | G06K 9/0063 | 382/103 |
| 2008/0199077 A1* | 8/2008 | Fowell | B64G 1/1007 | 382/190 |
| 2009/0177398 A1* | 7/2009 | Belenkii | G01C 21/025 | 701/500 |
| 2010/0208244 A1* | 8/2010 | Earhart | G01S 7/4816 | 356/139.01 |
| 2012/0044476 A1* | 2/2012 | Earhart | G01S 7/4814 | 356/4.01 |
| 2012/0249775 A1* | 10/2012 | Paluszek | G01C 21/24 | 348/117 |
| 2014/0340522 A1* | 11/2014 | Dawson | H04N 5/2259 | 348/169 |
| 2015/0226827 A1* | 8/2015 | Aycock | G01S 3/7861 | 382/103 |
| 2015/0371431 A1* | 12/2015 | Korb | H04N 19/136 | 382/113 |

* cited by examiner

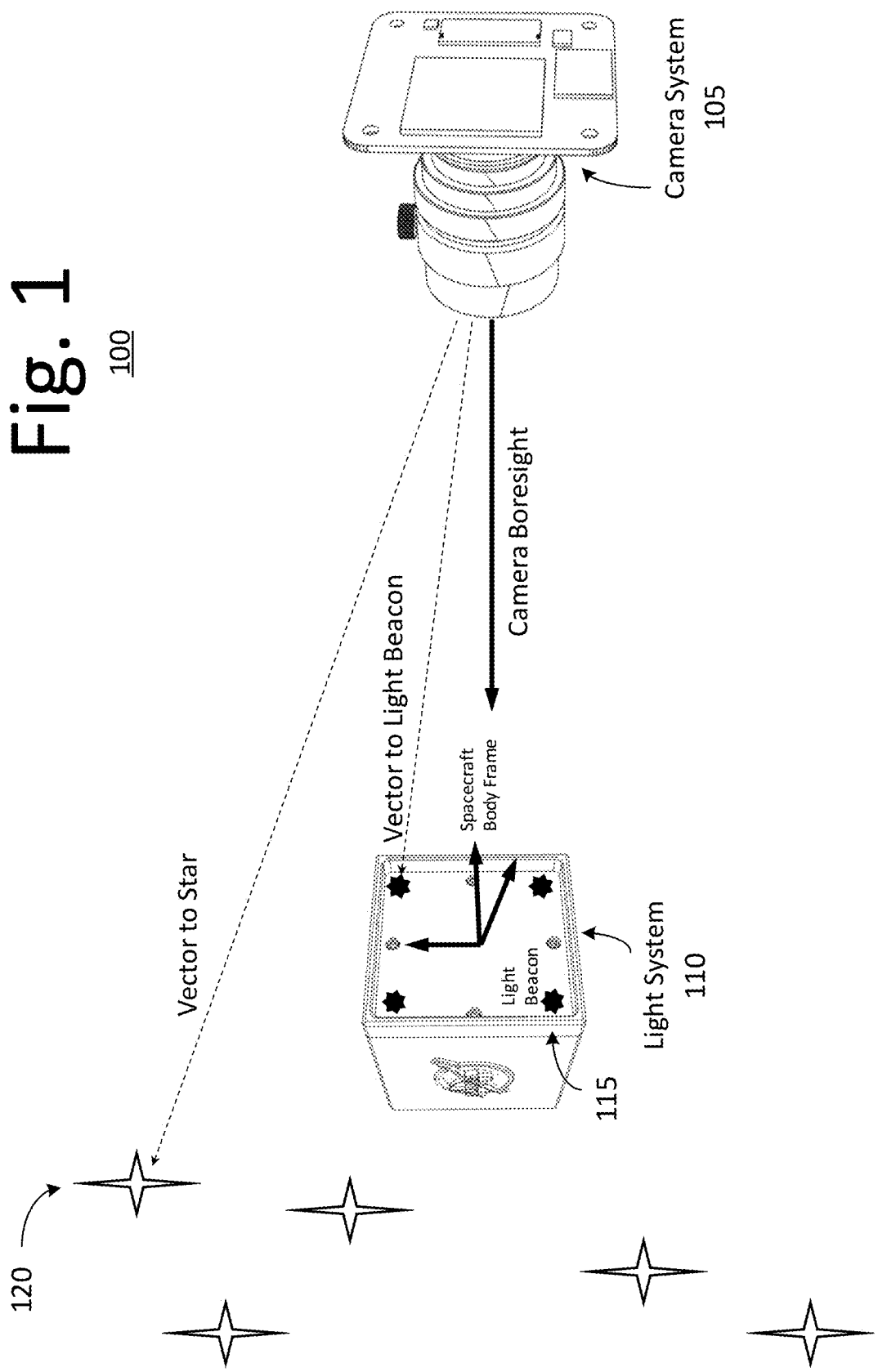

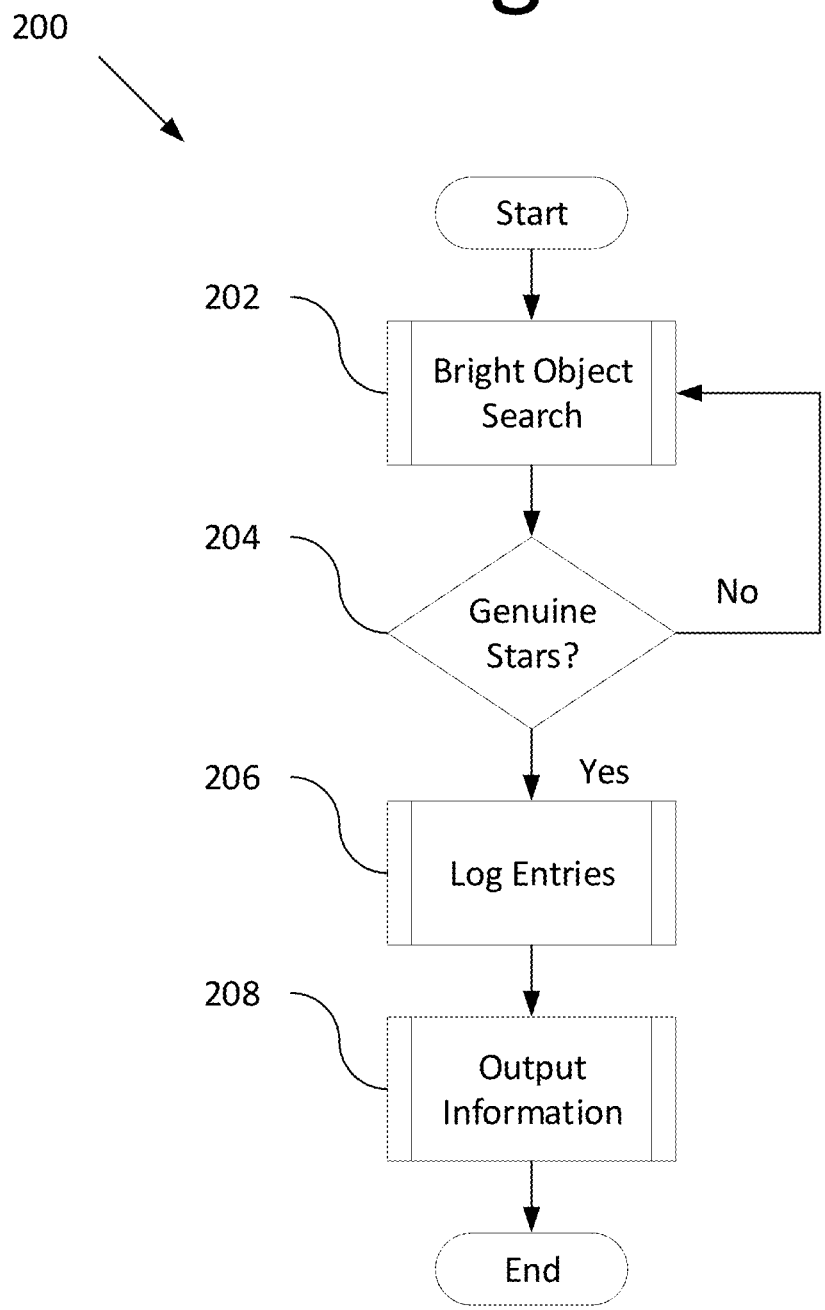

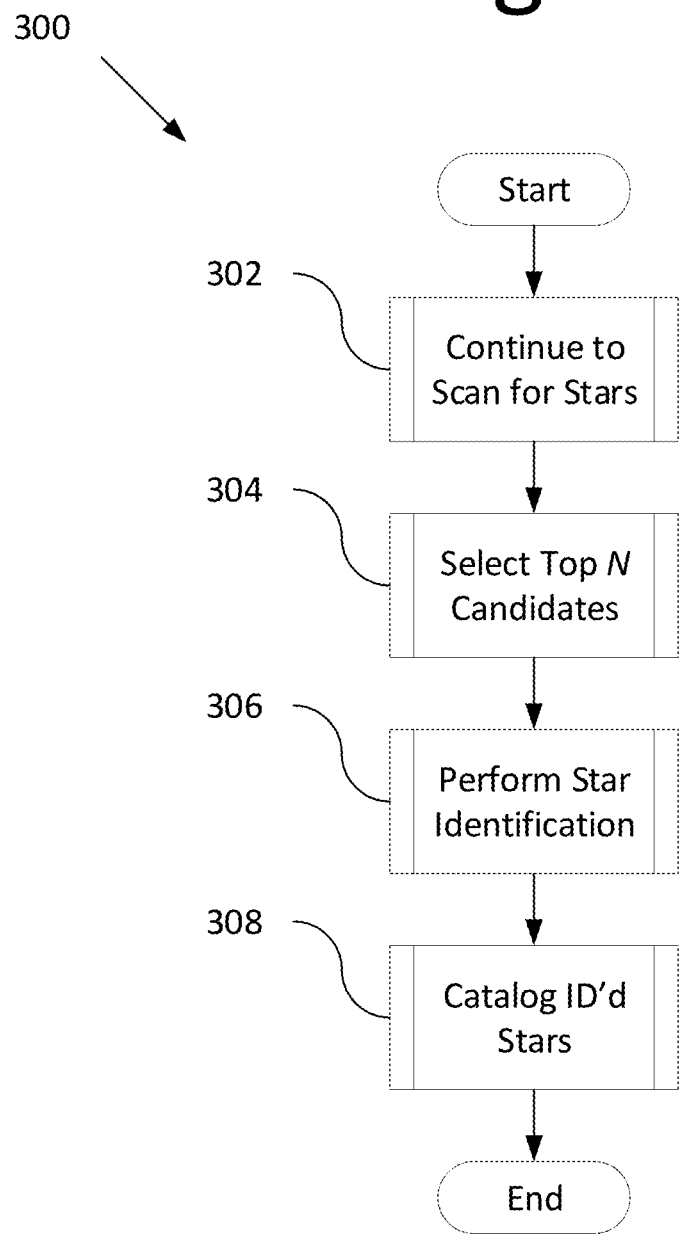

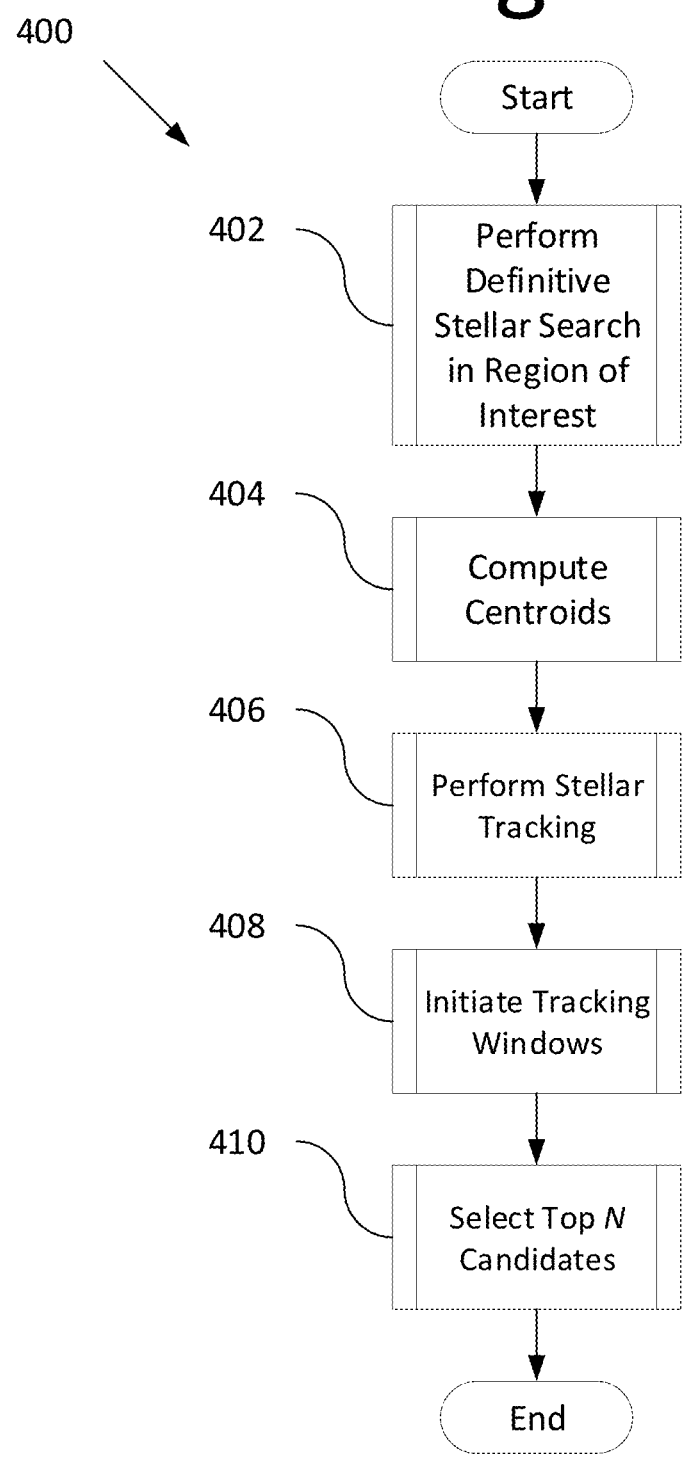

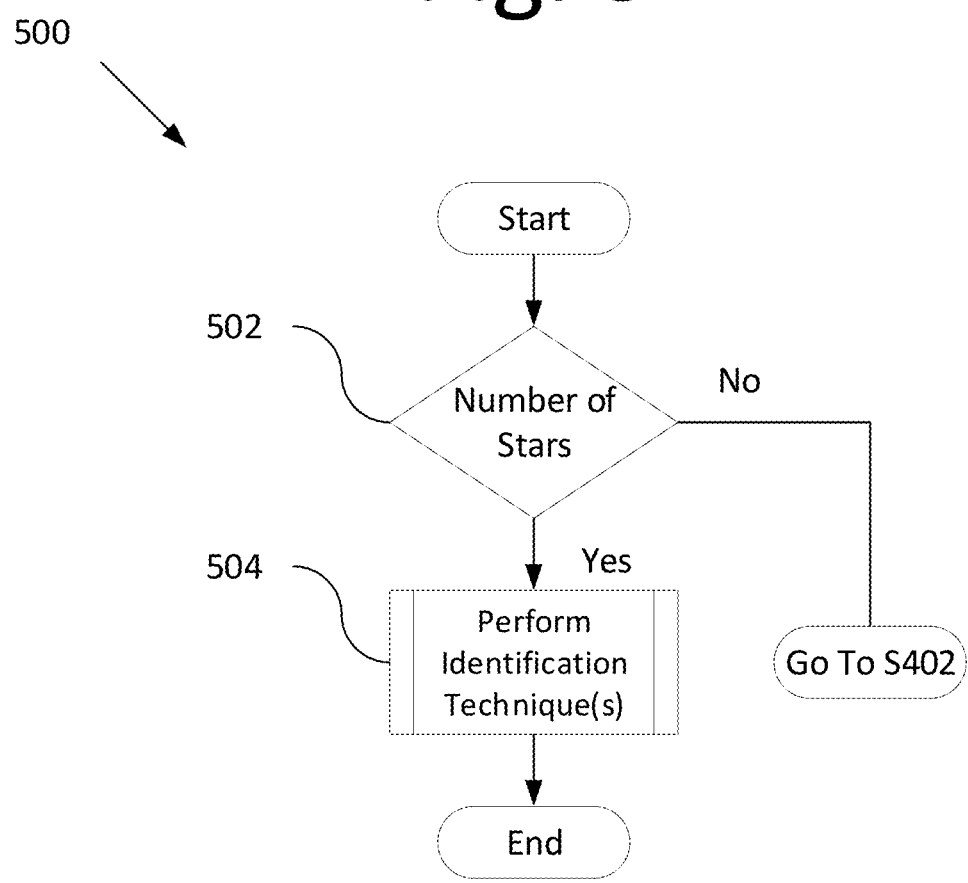

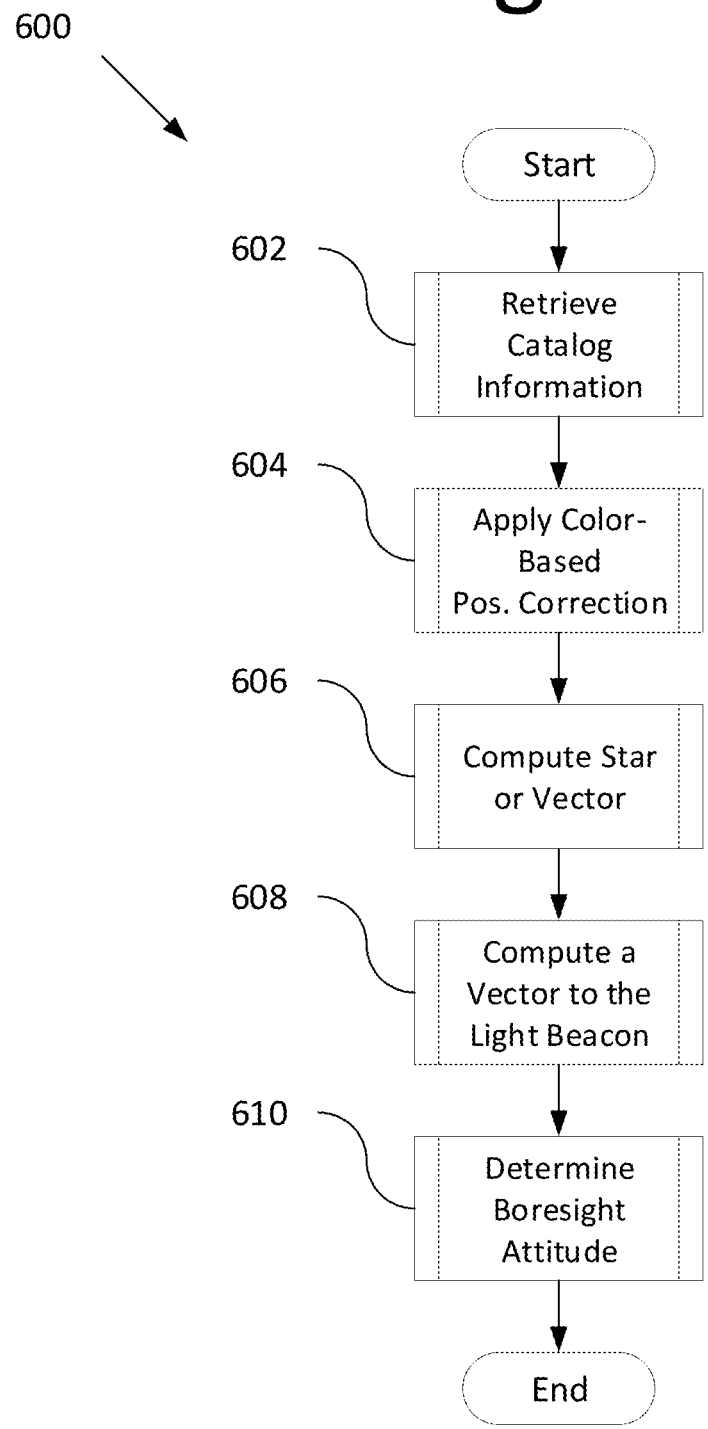

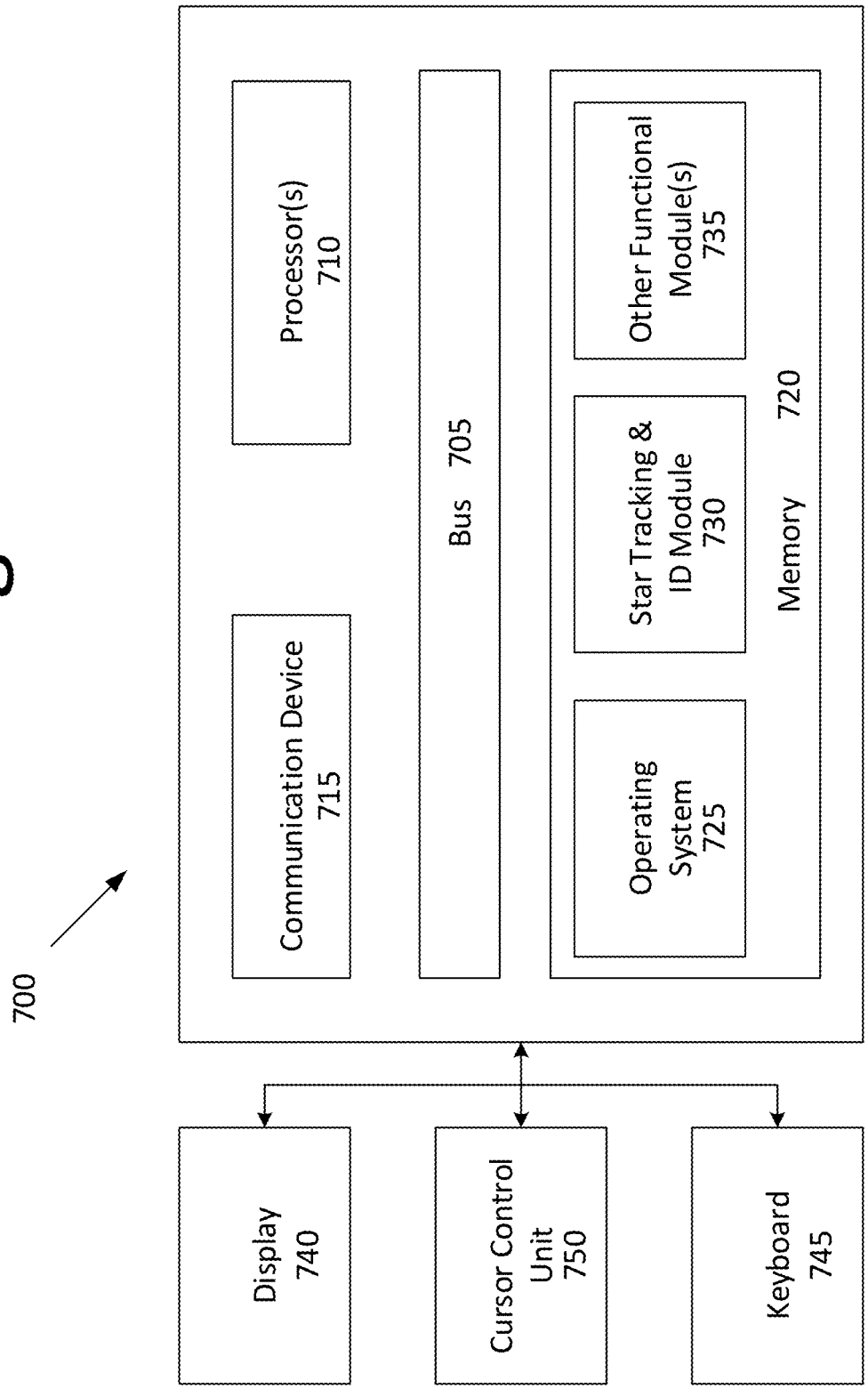

MINIATURIZED ASTROMETRIC ALIGNMENT SENSOR FOR DISTRIBUTED AND NON-DISTRIBUTED GUIDANCE, NAVIGATION, AND CONTROL SYSTEMS

STATEMENT OF FEDERAL RIGHTS

The invention described herein was made by employees of the United States Government and may be manufactured and used by or for the Government for Government purposes without the payment of any royalties thereon or therefore.

FIELD

The present invention relates to a miniaturized astrometric alignment sensor, and more particularly, to a miniaturized astrometric alignment sensor configured to detect stellar objects and targets from which both stellar and object tracking are performed.

BACKGROUND

The current state of the art for formation flying relative positioning and rotational control to an inertial reference consist of the following:
(1) radio ranging to ground stations for orbit control with various on-board sensors to determine the inertial reference for reconstruction on the ground;
(2) laser ranging with various on-board sensors to determine the inertial reference for reconstruction on the ground;
(3) GPS and radio ranging, plus various on-board sensors to determine the inertial reference for reconstruction on the ground; and
(4) various optical (visible to IR wavelength) sensors to determine relative knowledge for rendezvous and docking operations with various on-board sensors to determine the inertial reference.

The aforementioned techniques however do not provide relative state knowledge and the inertial reference, simultaneously. The reconstruction of this information requires multiple sensors to combine this information to control the spacecraft formation. This reconstruction must also account for errors caused by mis-alignments between multiple sensor mounting locations, as well as other on-orbit sensor behaviors that contribute to errors affecting the science measurements and/or imaging quality.

Currently, a sensor that combines both, the relative and inertial spacecraft knowledge in the same image frame does not exist. Thus, a sensor, including an algorithm, that solves the above-mentioned problems may be beneficial.

SUMMARY

Certain embodiments of the present invention may provide solutions to the problems and needs in the art that have not yet been fully identified, appreciated, or solved by current sensor technology within a CubeSat. For example, some embodiments generally pertain to a miniaturized astrometric alignment sensor configured to detect stellar objects and targets from which both stellar and object tracking are performed.

In an embodiment, a computer implemented method includes searching, by a computing system, for one or more bright objects in an image captured by a space vehicle onboard camera. The method also includes determining, by the computing system, if the one or more bright objects is a genuine star or a secondary element. The method further includes cataloging, by the computing system, identified stars after three or more bright objects are determined to be genuine stars. The method includes reporting and displaying, by the computing system, the cataloged entries of the identified stars. The cataloged entries include the position and velocity of the space vehicle in relation to the identified stars, and a sensor body reference frame.

In another embodiment, an apparatus includes at least one processor and memory which includes a set of instructions. The set of instructions, with the at least one processor, causes the apparatus to search for one or more bright opens in an image captured by a camera of a space vehicle, and determine if the one or more bright objects is a genuine star or a secondary element. The set of instructions, with the at least one processor, further causes the apparatus to catalog entries of identified stars after three or more bright objects are determined to be genuine stars, and display the cataloged entries of the identified stars. The cataloged entries include positional and velocity of the space vehicle in relation of the identified stars and a sensor body reference frame.

In yet another embodiment, a computer program is embodied on a non-transitory computer readable medium. The computer program, when executed, is configured to cause a computing system to perform searching for one or more bright opens in an image captured by a camera of a space vehicle, and determining if the one or more bright objects is a genuine star or a secondary element. The computer program, when executed, is further configured to cause a computing system to perform cataloging entries of identified stars after three or more bright objects are determined to be genuine stars, and displaying the cataloged entries of the identified stars. The cataloged entries include positional and velocity of the space vehicle in relation of the identified stars and a sensor body reference frame.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIG. 1 is a diagram illustrating a system for identifying stars and a light beacons, according to an embodiment of the present invention.

FIG. 2 is a flow diagram illustrating a process for distinguishing objects in a captured image, according to an embodiment of the present invention.

FIG. 3 is a flow diagram illustrating a concurrent process for identifying additional stars, according to an embodiment of the present invention.

FIG. 4 is a flow diagram illustrating a process for selecting stars in a captured image, according to an embodiment of the present invention.

FIG. 5 is a flow diagram illustrating a process for determining genuine stars, according to an embodiment of the present invention.

FIG. 6 is a flow diagram illustrating a process for outputting information of the spacecraft in relation to the stars, according to an embodiment of the present invention.

FIG. 7 is a block diagram illustrating a computing system for identifying stars in relation to spacecraft's position and velocity, according to one embodiment of the present invention.

DETAILED DESCRIPTION OF THE EMBODIMENTS

Some embodiments generally pertain to a CubeSat stellar sensor architecture (the "sensors") for astrometric alignments necessary for formation and relative navigation missions. The sensors are configured to perform high-fidelity science measurements with the intent to achieve arc-second level and better line of sight pointing.

FIG. 1 is a diagram 100 illustrating a system for identifying stars and a light beacons, according to an embodiment of the present invention. In an embodiment, a camera system 105 having a board level camera or a nano camera are configured to identify stars. For example, camera system 100 may capture an image containing a light system 110 and a plurality of stars. In this illustration, light system may have a plurality of light beacons 115 with the boresight of camera system 105 pointed towards the light system 110. In this embodiment, diagram 100 illustrated in FIG. 1. contains one possible configuration to perform astrometric alignment measurements. By determining, tracking, and reporting relative camera system 105 vectors to genuine stars 120 and light beacons 115, astrometric alignment is achievable.

In some embodiments, camera system 105 may include an executable code that is configured to cause a processor to process an image containing stars 120 and secondary elements or light system (e.g., spacecraft) 110 in the same field of view for relative navigation or formation flying purposes. For example, the executable code may cause the processor to process the captured images and output (position and velocity) information related to light system 110 and stars 120.

FIG. 2 is a flow diagram illustrating a process 200 for distinguishing objects in a captured image, according to an embodiment of the present invention. In some embodiments, process 200 may be executed by computing system 700 of FIG. 7. At 202, the computing system searches for bright objects in an image captured by a camera. For example, stars and any secondary elements, such as spacecraft, are searched for in step 202. At 204, the computing system determines if the bright objects are genuine stars or secondary elements. If the bright objects are not genuine stars or secondary elements, process 200 may terminate, or in another embodiment, the computing system continues to search for bright objects at 202.

At 206, when 3 or more bright objects are identified as stars, the computing system logs entries of the identified stars, and at 208, the computing system outputs (or displays) this information. This information may be used later on in the overall process to identify the position and velocity of the spacecraft in relation of the stars and the sensor body reference frame.

FIG. 3 is a flow diagram illustrating a concurrent process 300 for identifying additional stars, according to an embodiment of the present invention. In some embodiments, process 300 may be executed by computing system 700 of FIG. 7. Further, process 300 may run concurrently with processes described with respect to FIGS. 2 and 4-6.

At 302, the computing system continues to scan the captured image for additional stars. When stars are found, the computing system selects the top N candidates for star identification at 304. At 306, the computing system performs star identification, and at 308, catalogs the identified star.

FIG. 4 is a flow diagram illustrating a process 400 for selecting stars in a captured image, according to an embodiment of the present invention. In some embodiments, process 400 may be executed by computing system 700 of FIG. 7.

At 402, the computing system performs a comprehensive stellar search for stars in a captured image. A stellar search in some embodiments is a search in any region of interest within an image frame for pixel values above a desired threshold. The desired threshold may be set by ground calibration including lab, night sky testing or other representative methods for tuning the system detection sensitivity.

At 404, the computing system computes centroids for the stars. For example, the centroid computation includes one or more of the following steps: (1) define a region of interest in the image, (2) perform a calibration by subtracting each pixel by its respective dark image value, (3) filter any additional background noise in the image, and (4) compute the weighted summation of the pixels in the region of interest.

At 406, the computing system performs stellar tracking. In some embodiments, stellar tracking may be defined as the determination of the relative position and velocity of a star in the image frame. This includes estimating (inferring) those quantities from the measured observations as discussed above.

At 408, the computing system initiates the required number of tracking windows. For example, when a bright object remains in the image frame over an extended number of time-steps, a tracking flag is assigned to the tracking window. This indicates a possible object of interest, namely a star or spacecraft.

At 410, the computing system selects the top N candidates for star identification.

FIG. 5 is a flow diagram illustrating a process 500 for determining genuine stars, according to an embodiment of the present invention. Process 500 may be executed by computing system 700 of FIG. 7.

In an embodiment, the computing system determining the number of available stars at 502. At 504, if the number of available stars is less than three, then the process returns to step 402 to perform another iteration of stellar search. Otherwise, if the number of stars is equal to or greater than three, the computing system executes one or more star identification techniques at 504. Star identification techniques may include Pyramid, Non-dimensional, Tetra, etc.

FIG. 6 is a flow diagram illustrating a process 600 for outputting information about the spacecraft (i.e., position, velocity, orientation, etc.) in relation to the stars, according to an embodiment of the present invention. Process 600 may be executed by computing system 700 of FIG. 7.

At 602, the computing system retrieves star catalog information for identified stars. The information in the catalog includes but is not limited to, the celestial inertial unit vector, right ascension and declination values, star magnitude, position and color uncertainty error values, as well as color index.

At 604, the computing system applies a color-based position correction to each identified star using its pre-defined color index. The color-based position correction uses a Nth-order polynomial for distortion correction within the image. In one embodiment, correction is based on the Brown-Conrady model distortion method. The computing system may further perform a pixel-to-angle based conversion.

At 606, the computing system computes a vector to the star, and at 608, computes the vector to the light beacon. In some embodiment, two computing steps are used since the pixel-to-angle data is converted to a 3-dimensional boresight unit vector with respect to the sensor's body frame.

At 610, the computing system determines the sensor's boresight attitude using a Singular Value Decomposition (SVD) approach or a similar attitude determination method such as Quaternion Estimator (QUEST), Estimator of the Optimal Quaternion 2 (ESOQ2), etc.

FIG. 7 is a block diagram illustrating a computing system 700 for identifying stars in relation to the spacecraft position and velocity, according to one embodiment of the present invention. Computing system 700 may include a bus 705 or other communication mechanism configured to communicate information, and at least one processor 710, coupled to bus 705, configured to process information. At least one processor 710 can be used. It can be either generic or specific, depending on its overall purpose. Computing system 700 may also include memory 720 configured to store information and instructions to be executed by at least one processor 710. Memory 720 can be comprised of any combination of random access memory ("RAM"), read only memory ("ROM"), static storage such as a magnetic or optical disk, or any other type of computer readable medium. Computing system 700 may also include a communication device 715, such as a network interface card, configured to provide access to a network.

The computer readable medium may be any available media that can be accessed by at least one processor 710. The computer readable medium may include both volatile and nonvolatile medium, removable and non-removable media, and communication media. The communication media may include computer readable instructions, data structures, program modules, or other data and may include any information delivery media.

At least one processor 710 can also be coupled via bus 705 to a display 740, such as a Liquid Crystal Display ("LCD"). Display 740 may display information to the user, such as positional and velocity information of the spacecraft with respect to the identified stars. A keyboard 745 and a cursor control unit 750, such as a computer mouse, may also be coupled to bus 705 to enable the user to interface with computing system 700.

According to one embodiment, memory 720 may store software modules that may provide functionality when executed by at least one processor 710. The modules can include an operating system 725 and a star tracking and identification module 730, as well as other functional modules 735. Operating system 725 may provide operating system functionality for computing system 700. Because computing system 700 may be part of a larger system, computing system 700 may include one or more additional functional modules 735 to include the additional functionality. For example, additional functional modules 735 may include navigation, guidance, and controls modules.

One skilled in the art will appreciate that a "system" could be embodied as a personal computer, a server, a console, a personal digital assistant (PDA), a cell phone, a tablet computing device, or any other suitable computing device, or combination of devices. Presenting the above-described functions as being performed by a "system" is not intended to limit the scope of the present invention in any way, but is intended to provide one example of many embodiments of the present invention. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

The process shown in FIGS. 2-6 may be performed, in part, by a computer program, encoding instructions for a nonlinear adaptive processor to cause at least the process described in FIGS. 2-6 to be performed by the apparatuses discussed herein. The computer program may be embodied on a non-transitory computer readable medium. The computer readable medium may be, but is not limited to, a hard disk drive, a flash device, a random access memory, a tape, or any other such medium used to store data. The computer program may include encoded instructions for controlling the nonlinear adaptive processor to implement the process described in FIGS. 2-6, which may also be stored on the computer readable medium.

The computer program can be implemented in hardware, software, or a hybrid implementation. The computer program can be composed of modules that are in operative communication with one another, and which are designed to pass information or instructions to display. The computer program can be configured to operate on a general purpose computer, or an application specific integrated circuit ("ASIC").

Simply put, the computer program, when executed, causes a computer to perform functions that are not well known or understood in the art. For example, in some embodiments, the computer program may cause the computer to search for small beacons of light that may be on a spacecraft. These small beacons of light have a different level of brightness compared to that of a star. Although there is literature of capturing images, none of the literature discusses processing the image to a precision solution that shows where the spacecraft is with respect to the stars for scientific measurement. In an embodiment, the computer program may cause the computer to search for one or more stars, and identify any element that is either bright or dim. When an element is found, the computer program causes the computer to determine if the element is a star or a spacecraft. With this information, the computer can determine where the spacecraft is pointed in relation to the stars.

It will be readily understood that the components of various embodiments of the present invention, as generally described and illustrated in the figures herein, may be arranged and designed in a wide variety of different configurations. Thus, the detailed description of the embodiments, as represented in the attached figures, is not intended to limit the scope of the invention as claimed but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A computer-implemented method, comprising:
    searching, by a computing system, for one or more bright objects in an image captured by a space vehicle onboard camera;
    determining, by the computing system, if the one or more bright objects is a genuine star or a secondary element;
    cataloging, by the computing system, identified stars after three or more bright objects are determined to be genuine stars;
    reporting and displaying, by the computing system, the cataloged entries of the identified stars, wherein the cataloged entries comprises the position and velocity of the space vehicle in relation to the identified stars, and a sensor body reference frame; and
    selecting one or more stars in the captured image, wherein the selecting of the one or more stars comprises:
    performing a stellar search for stars in the captured image;
    computing centroids for the one or more stars;
    performing stellar tracking for the one or more stars;
    initiating N tracking windows for the one or more stars; and
    selecting one or more top N candidates to identify one or more stars:
    wherein N is an integer number and TOP N is an integer number less than N.

2. The computer-implemented method of claim 1, further comprising:
    continuously searching for one or more additional stars in the captured image;
    selecting a predetermined number of candidates for star identification, when one or more additional stars are found; and
    performing star identification.

3. The computer-implemented method of claim 1, wherein the computing of the centroid comprises:
    defining a region of interest in the captured image;
    performing a calibration by subtracting each pixel in the captured image by a corresponding dark image value;
    filtering one or more additional background noise in the captured image; and
    computing a weighted summation of each pixel in a region of interest in the captured image.

4. The computer-implemented method of claim 1, wherein the stellar tracking comprises determining of the positional and velocity of a star in a frame of the captured image.

5. The computer-implemented method of claim 1, wherein the determining of the genuine star or secondary element comprises:
    determining a number of available stars in the captured image; and
    executing a star identification technique to determine if the identified star is a genuine star.

* * * * *